March 9, 1954 R. LAPSLEY 2,671,544
TRANSMISSION
Filed April 19, 1952 5 Sheets-Sheet 1
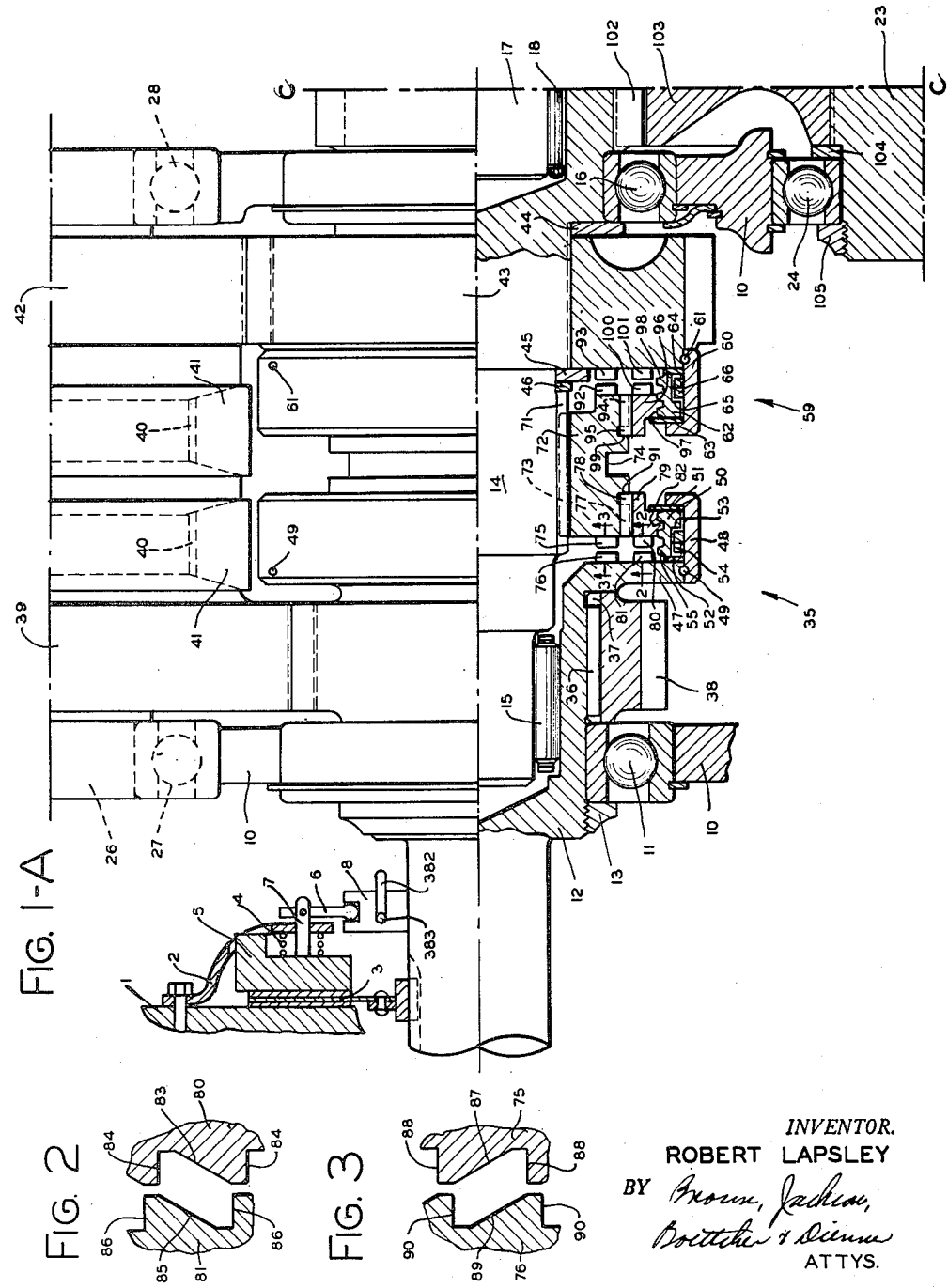
INVENTOR.
ROBERT LAPSLEY
BY [signature]
ATTYS.

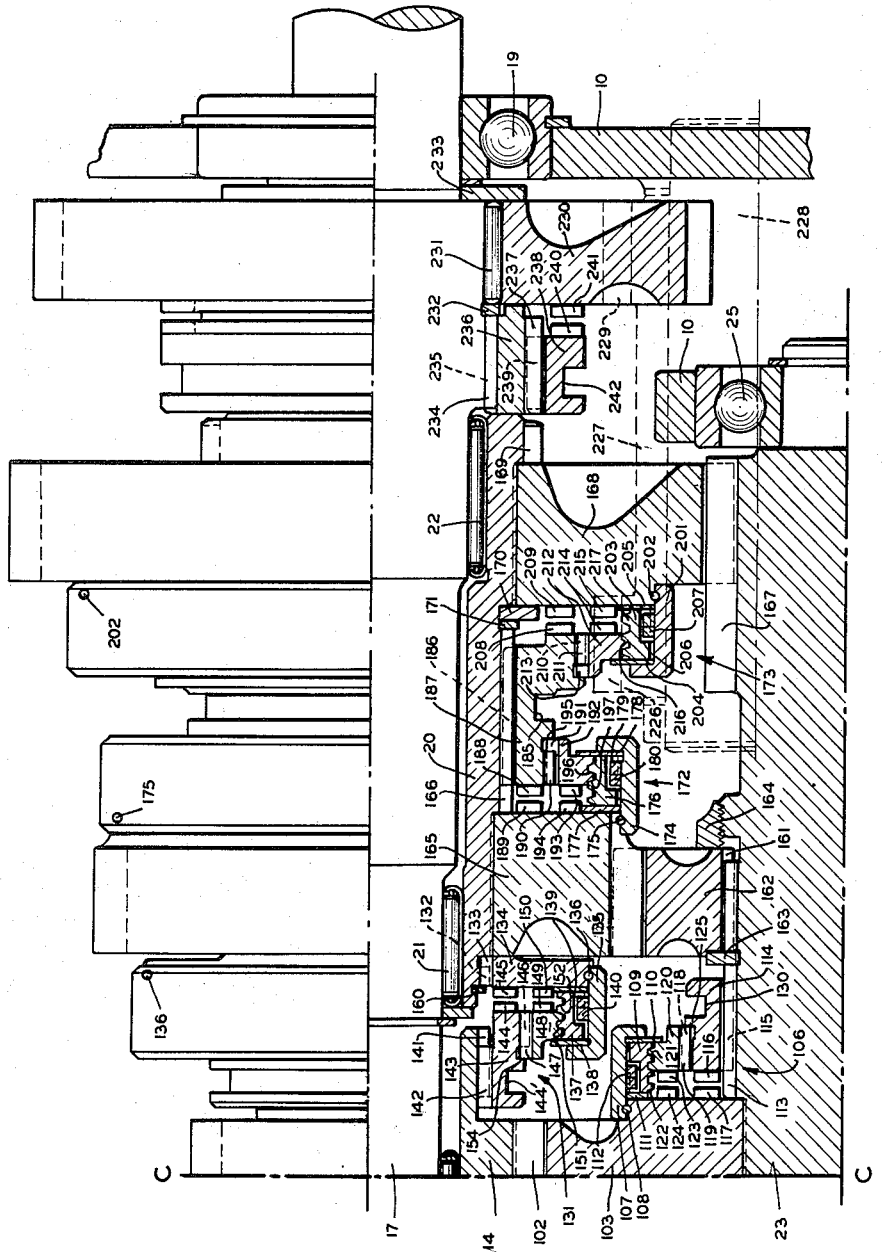

March 9, 1954  R. LAPSLEY  2,671,544
TRANSMISSION
Filed April 19, 1952  5 Sheets-Sheet 3

INVENTOR.
ROBERT LAPSLEY
BY
ATTYS.

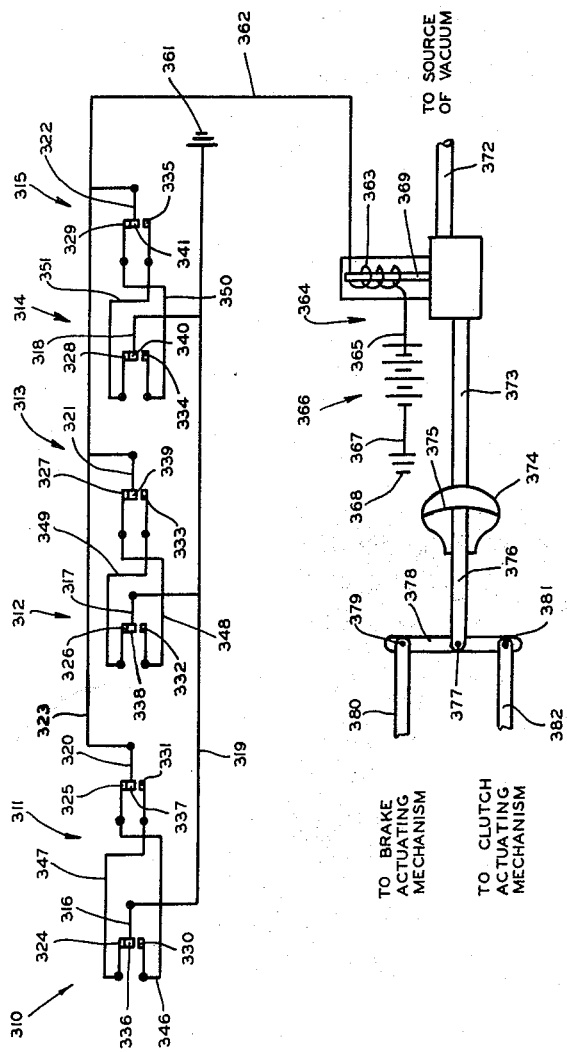

March 9, 1954  R. LAPSLEY  2,671,544
TRANSMISSION
Filed April 19, 1952  5 Sheets-Sheet 5

FIG. 7

| | CLUTCH MECHANISMS ENGAGED | CONTACTS CLOSED | | | | | | | SOLENOID | MAIN CLUTCH | BRAKE SHOES | DIRECTION OF SHIFT SPRING PRESSURE |
|---|---|---|---|---|---|---|---|---|---|---|---|---|
| | | SWITCH 310 | SWITCH 311 | SWITCH 312 | SWITCH 313 | SWITCH 314 | SWITCH 315 | | | | | |
| 1ST RATIO | 59, 106, 173 | 324 336 | 325 337 | 326 338 | 327 339 | 328 340 | 329 341 | DEENERGIZED | ENGAGED | RELEASED | TO HOLD 59, 106, 173 ENGAGED |
| SHIFT ORDERED FROM 1ST TO 2ND | 59 ORDERED TO RELEASE – 106, 173 HELD ENGAGED | 330 336 | 325 337 | 326 338 | 327 339 | 328 340 | 329 341 | ENERGIZED | ORDERED TO RELEASE | ORDERED TO ENGAGE | TO HOLD 106, 173 ENGAGED / TO RELEASE 59 / TO ENGAGE 35 |
| SHIFT STARTS FROM 1ST TO 2ND | 106, 173 HELD ENGAGED – 35 STARTS TO ENGAGE | 330 336 | 325 337 | 326 338 | 327 339 | 328 340 | 329 341 | ENERGIZED | RELEASED | ENGAGED | TO HOLD 106, 173 ENGAGED / TO ENGAGE 35 |
| SHIFT COMPLETED FROM 1ST TO 2ND | 35, 106, 173 | 330 336 | 331 337 | 326 338 | 327 339 | 328 340 | 329 341 | DEENERGIZED | STARTS TO ENGAGE | STARTS TO RELEASE | TO HOLD 35, 106, 173 ENGAGED |
| 2ND RATIO | 35, 106, 173 | 330 336 | 331 337 | 326 338 | 327 339 | 328 340 | 329 341 | DEENERGIZED | ENGAGED | RELEASED | TO HOLD 35, 106, 173 ENGAGED |
| SHIFT ORDERED FROM 2ND TO 1ST | 35 ORDERED TO RELEASE – 106, 173 HELD ENGAGED | 324 336 | 331 337 | 326 338 | 327 339 | 328 340 | 329 341 | ENERGIZED | STARTS TO RELEASE | STARTS TO ENGAGE | TO HOLD 106, 173 ENGAGED / TO RELEASE 35 / TO ENGAGE 59 |
| SHIFT STARTS FROM 2ND TO 1ST | 106, 173 HELD ENGAGED – 59 STARTS TO ENGAGE | 324 336 | 325 337 | 326 338 | 327 339 | 328 340 | 329 341 | DEENERGIZED | STARTS TO ENGAGE | STARTS TO RELEASE | TO HOLD 106, 173 / TO ENGAGE 59 |
| SHIFT COMPLETED FROM 2ND TO 1ST | 59, 106, 173 | 324 336 | 325 337 | 326 338 | 327 339 | 328 340 | 329 341 | DEENERGIZED | ENGAGED | RELEASED | TO HOLD 59, 106, 173 ENGAGED |

NOTE: ALL OTHER SHIFTS FOLLOW THE ABOVE SEQUENCE WHEN SHIFTING TO A FASTER RATIO OR TO A LOWER RATIO, THE UNIT NUMBERS CHANGING IN ACCORD WITH THE SWITCHES OR CLUTCHES EFFECTED.

INVENTOR.
ROBERT LAPSLEY
BY Brown, Jackson, Boettcher & Dienner
ATTYS.

Patented Mar. 9, 1954

2,671,544

UNITED STATES PATENT OFFICE 2,671,544

TRANSMISSION

Robert Lapsley, Buchanan, Mich., assignor to Clark Equipment Company, Buchanan, Mich., a corporation of Michigan Application April 19, 1952, Serial No. 283,177

13 Claims. (Cl. 192—3.5)

My present invention relates generally to transmissions, and, more specifically, is directed to control means for a multi-speed transmission suitable for use, for example, with self-propelled vehicles, such as trucks, tractors, and other like vehicles.

It is an object of my present invention to provide a transmission and control means therefor which will permit any desired drive ratio to be selected, regardless of the relative speeds between the rotating members to be clutched together, but which will prevent the selected drive ratio from becoming operative until the rotating members to be clutched together are rotating substantially in synchronism.

In the embodiment of transmission with which the control means of my present invention is incorporated, I employ compound clutch mechanisms of the character forming the subject matter of my copending application, Serial No. 283,176 filed April 19, 1952. The transmission, to be described in detail hereinafter, includes a drive shaft, main clutch means associated with the drive shaft, a driven shaft, brake means associated with the driven shaft, a gear driven from the drive shaft and journaled on the driven shaft, and a compound clutch mechanism for selectively clutching either the gear or the drive shaft to the driven shaft. The compound clutch mechanism includes a compound clutch element non-rotatably mounted on the driven shaft and axially movable therealong, which is adapted in one position to clutch the gear to the driven shaft in one direction of rotation of the gear relative to the driven shaft and in another position to clutch the drive and driven shafts together in one direction of rotation of the drive shaft relative to the driven shaft.

Non-rotatably mounted on the compound clutch element, but axially movable therealong, are first and second clutch elements. The first clutch element is adapted to clutch the gear to the driven shaft in the other direction of rotation of the gear relative to the drive shaft, and the second clutch element is adapted to clutch the drive and driven shafts together in the other direction of rotation of the drive shaft relative to the driven shaft.

The clutch mechanism also includes spring actuated means for effecting engagement of the first clutch element upon rotation of the gear in one direction relative to the driven shaft and for effecting disengagement of the first clutch element upon rotation of the gear in the other direction relative to the driven shaft, and second spring actuated means for effecting engagement of the second clutch element upon rotation of the drive shaft in one direction relative to the driven shaft and for effecting disengagement of the second clutch element upon rotation of the drive shaft in the other direction relative to the driven shaft.

The control means for the aforedescribed transmission comprises a shift fork associated with the compound clutch element, and first spring means associated with the shift fork for normally biasing the compound clutch element into a first position clutching the gear and driven shaft together when the first clutch element is being engaged.

A preferred feature of my invention has to do with the provision of a pivotally mounted plunger housing and a lever operatively interconnecting the plunger housing and the shift fork. A spring biased plunger extends through the plunger housing and means, preferably in the form of a cam bar, is provided for effecting movement of the plunger whereby the plunger housing is spring loaded for pivotal movement and the compound clutch element is disengaged from the first position and biased into a second position clutching the drive and driven shafts together when the second clutch element is being engaged. The spring loaded plunger housing is adapted to exert a greater force than the first spring means. The compound clutch element and the second clutch element are so arranged that even though the compound clutch element is biased toward the second position, the latter will not clutch the drive and driven shafts together unless they are rotating substantially synchronously. The compound clutch element cannot be engaged in the second position unless the second clutch element is engaged or is being engaged. Likewise, the compound clutch element cannot be engaged in the first position unless the first clutch element is engaged or is being engaged. This construction is of advantage in that gear clash between the rotating members which are to be clutched together is prevented.

I have found that a compound clutch element embodied in a transmission as above related is not readily disengageable from the associated clutched member, when such disengagement is ordered by the control means, due to the driving force between the rotating compound clutch element and the said associated clutched member.

It is another object of my present invention to overcome the aforementioned difficulty by providing means for removing or releasing the driving force between the compound clutch element and the associated clutched member prior to disengagement therefrom.

It is a further object of my present invention to provide means for interrupting drive to the drive shaft when the compound clutch element is being engaged or disengaged.

It is a still further object of my invention to provide means for actuating the brake means associated with the driven shaft when the compound clutch element is being engaged or disengaged.

To accomplish these objects, in the preferred form of my invention herein disclosed, vacuum responsive means is employed to effect disengagement of the main clutch means and actuation of the brake means. It will be understood by those skilled in the art that air or fluid pressure actuated means may be employed in place of the vacuum responsive means. Conveniently, solenoid actuated valve means is associated with the vacuum responsive means and is adapted when electrically energized to render the latter operative. The solenoid actuated valve is controlled by electric circuit means, which includes first and second switches connected in series. The first switch is normally open and the second switch normally closed. Movement of the aforedescribed plunger for conditioning the compound clutch element for movement, from the first to the second position, effects closing of the first switch whereby the electric circuit means is closed and the solenoid actuated valve electrically energized. When the solenoid actuated valve is electrically energized, the vacuum responsive means effects opening of the main clutch means and actuation of the brake means, thus removing the driving force between the compound clutch element and the gear, permitting the compound clutch element to move from the first position to the second position. A portion of the plunger housing is adapted to open the second switch and the electric circuit means to permit reengagement of the main clutch means and release of the brake means when the compound clutch element is moved into the second clutching position. The switches are actuated in the reverse manner when the compound clutch element is moved from the second position to the first position.

Now, in order to acquaint those skilled in the art with the manner of constructing and using transmissions in accordance with the principles of my present invention, I shall describe in connection with the accompanying drawings a preferred embodiment of my invention.

In the drawings:

Figures 1-A and 1-B when laid end to end along the dot-dash line C—C show a transmission, partly in section and partly in elevation, with which the control means of my present invention is embodied;

Figure 2 is a sectional view of one pair of clutch teeth taken along the line 2—2 in Figure 1-A, looking in the direction indicated by the arrows;

Figure 3 is a sectional view of a second pair of clutch teeth taken along the line 3—3 in Figure 1-A, looking in the direction indicated by the arrows;

Figure 6 is a diagrammatic layout of the electrical circuit and vacuum system of the control means of my present invention; and Figure 7 is a chart of operations of the transmission and control means shown in Figures 1 through 6.

Figure 4:
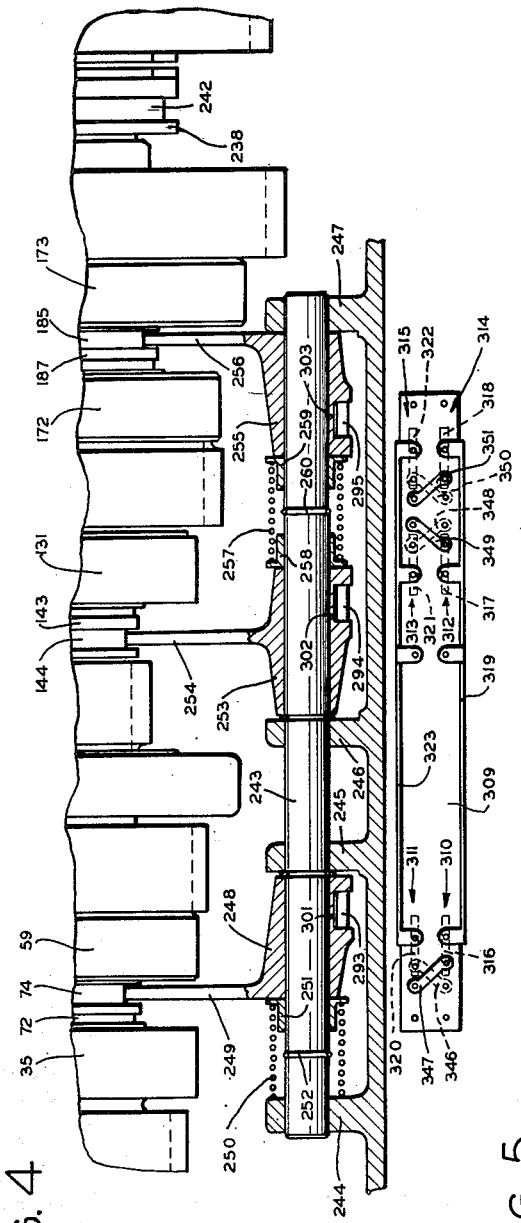
Figure 4 is a plan view of the transmission of Figures 1-A and 1-B, and of the control means therefor.

Referring now to the drawings, there is indicated, at 1, a flywheel which has suitable connection with a prime mover, as, for example, an internal combustion engine (not shown). Secured to the flywheel 1, at the outer periphery thereof, is a clutch casing 2 which provides an enclosure for a clutch disc 3. The clutch disc 3 is normally biased into engagement with the flywheel 1 by clutch pressure plate springs 4, disposed between a clutch pressure plate 5 and the clutch casing 2. Clutch release levers 6 are pivotally mounted intermediate their ends to clutch release lever pins 7, which are secured to the clutch pressure plate 5. The levers 6 are actuated through a clutch release hub 8.

The transmission of my present invention, to be described in detail hereinafter, is enclosed by a housing, a portion of which is shown at 10. The transmission housing 10 is adapted to be secured to the engine flywheel housing (not shown) in the known and conventional manner. Mounted in the front end wall of the transmission housing 10 is a ball bearing assembly 11, in which is journaled an input shaft 12. A nut 13, threaded onto the input shaft 12, retains the ball bearing assembly 11 in position on the shaft 12. The hub of the clutch disc 3 and the clutch release hub 8 are mounted on the input shaft 12 for rotation therewith, but are free to move axially therealong. The clutch release mechanism, above described, is preferably power actuated by a vacuum cylinder in a manner to be described hereinafter.

An intermediate shaft 14 is arranged coaxially of the input shaft 12, and the forward end of the shaft 14 is mounted for rotation in a plurality of needle bearings 15 carried within an opening formed in the rear end of the input shaft 12. The shaft 14, adjacent its rear end, is journaled in a ball bearing assembly 16, suitably retained in the housing 10. An output shaft 17 is arranged coaxially of the input shaft 12 and the intermediate shaft 14, and the forward end of the output shaft 17 is journaled in a plurality of needle bearings 18 which are mounted within an opening formed in the rear end of the intermediate shaft 14. The output shaft 17, adjacent its rear end, is journaled in a ball bearing assembly 19, retained in the rear end wall of the transmission housing 10.

A sleeve member 20 is disposed concentrically about the output shaft 17. The sleeve member 20, at its forward end, is journaled on needle bearings 21 arranged about the outer periphery of the output shaft 17, and the sleeve 20, at its rear end, is journaled on needle bearings 20 arranged about the outer periphery of the output shaft 17.

A countershaft or jackshaft 23 extends parallel to, but spaced from, the intermediate shaft 14 and the sleeve member 20. The forward end of the countershaft 23 is journaled in a ball bearing assembly 24 suitably mounted in the transmission housing 10, and the rear end of the countershaft 23 is journaled in a ball bearing assembly 25 suitably retained in the transmission housing 10.

A countershaft or jackshaft 26 is arranged parallel to, but spaced from, the intermediate shaft 14, and the shaft 26, at its forward end, is journaled in a ball bearing assembly 27 suitably retained in the forward wall of the transmission housing 10, while the rear end of the shaft 26 is journaled in a ball bearing assembly 28, also mounted within the transmission housing 10.

The input shaft 12, adjacent its rear end, is formed with external straight splines 36 which receive the internal straight splines 37 of a gear 38. The gear 38 is thus mounted for conjoint rotation with the input shaft 12. The gear 38 meshes with a gear portion 39 formed on the jackshaft 26. Formed integrally with the jackshaft 26, rearwardly of gear 39, are a pair of axially spaced circumferential grooves 40 having tapered sides. Disposed within the grooves 40 are brake shoes or bands 41 which are provided for selectively braking the jackshaft 26, for a purpose and in a manner to be described hereinafter. Also formed integrally with the jackshaft 26, rearwardly of grooves 40, is a gear portion 42 which meshes with a gear 43 journaled on the intermediate shaft 14, immediately forwardly of the ball bearing assembly 16. The gear 43 is held against endwise movement by thrust washers 44 and 35 which are retained in place by a spring ring 46.

The rear end of the input shaft 12 is formed with a radially outwardly extending flange portion 47, to which, at the outer periphery thereof, is secured an axially rearwardly extending annular clutch drum 48 forming part of a clutch mechanism, indicated at 35. The clutch drum 48 is secured to the flange 47 by means of suitable locating and drive pins 49. Assembled within the confines of the clutch drum 48 is an annular shift actuator ring or spring carrier 50 which is free to rotate relative to the clutch drum 48, but is restrained against axial movement therein by antifriction thrust washers 51 and 52. The actuator ring 50 is formed with an external peripheral groove 53, in which is disposed a coil spring friction clutch 54. One end of the coil spring friction clutch 54 is secured within the actuator ring 50 and the other end of the spring 54 is free. The spring 54 thus rotates conjointly with the actuator ring 50. As will be readily apparent to those skilled in the art, if the clutch drum 48 rotates in a direction from the anchored end of the clutch spring 54 toward its free end, the clutch spring 54 will tend to wrap about the actuator ring 50 and the outer periphery of the clutch spring 54 will only lightly engage the inner periphery of the clutch drum 48. On the other hand, if the clutch drum 48 rotates in a direction away from the free end of the clutch spring 54, toward its anchored end, the force of engagement between the outer periphery of the clutch spring 54 and the inner periphery of the clutch drum 48 will increase as the clutch spring 54 tends to enlarge, thereby tending to clutch the spring 54 to the clutch drum 48, which, in turn, tends to cause the actuator ring 50 to rotate conjointly with the clutch drum 48.

The inner periphery of the actuator ring 50 is formed with helical threads or splines 55 for a purpose to be fully described hereinafter.

An axially forwardly extending annular clutch drum 60, forming part of a clutch mechanism 59, is secured by suitable locating and drive pins 61 to the aforementioned gear 43 journaled on the intermediate shaft 14. Assembled within the confines of the clutch drum 60 is an annular shift actuator ring or spring carrier 62 which is free to rotate within the clutch drum 60, but is restrained against axial movement therein by antifriction thrust washers 63 and 64. An external peripheral groove 65 is formed in the actuator ring 62 and disposed therein is a coil spring friction clutch 66 which, at one end, is anchored in the actuator ring 62 and, at its other end, is free. As described above in connection with the clutch mechanism 35, which the clutch drum 60 rotates away from the anchored end of the coil spring 66 toward its free end, the latter will only lightly frictionally engage the clutch drum 60, and when the clutch drum 60 rotates away from the free end of the coil spring 66 toward its anchored end, the latter will enlarge tending to clutch the coil spring 66 to the clutch drum 60. The actuator ring 62 will then tend to rotate conjointly with the clutch drum 60.

The shaft 14, forwardly of the gear 43, is formed with external straight splines 71, which, at their rear end, provide a stop for the aforedescribed spring ring 46. An annular clutch hub 72, having internal straight splines 73, is mounted on the splines 71 of shaft 14 for axial movement therealong. The clutch hub 72, intermediate of its ends, is formed with an annular groove 74 which is adapted to receive a shift fork, as will be described hereinafter. The forward end of the shift hub 72 is formed with a plurality of circumferentially spaced radially extending jaw clutch or ratchet teeth 75 which are adapted to be disposed selectively in engagement with circumferentially spaced radially extending jaw clutch or ratchet teeth 76 formed integrally with the radial flange 47 of the input shaft 12. The forward end of the shift hub 72 is also formed with external straight splines 77 which co-operate with the internal straight splines 78 of a clutch element 79. The clutch element 79, at its forward end, is formed with a plurality of circumferentially spaced radially extending jaw clutch or ratchet teeth 80 which are adapted to be disposed selectively in engagement with circumferentially spaced radially extending jaw clutch or ratchet teeth 81 formed integrally with the radial flange 47 of the input shaft 12. The clutch element 79 is also formed with external helical threads or splines 82 which are disposed in engagement with the internal helical threads or splines 55 of the aforedescribed actuator ring 50.

As shown in Figure 2, the clutch teeth 80 are formed with ramps 83 and driving faces 84, and the clutch teeth 81 are formed with ramps 85 and driving faces 86. As shown in Figure 3, the clutch teeth 75 are formed with ramps 87 and driving faces 88, and the clutch teeth 76 are formed with ramps 89 and driving faces 90. The planes of the faces of the ramps 83 and 85 of clutch teeth 80 and 81 extend diagonally of the planes of the faces of the ramps 87 and 89 of clutch teeth 75 and 76.

The clutch hub 72 is formed with an annular shoulder 91 which normally abuts against the rear end of the clutch element 79, as shown in Figure 1-A. If the clutch hub 72 is biased to the left, in a manner to be described hereinafter, the clutch teeth 75 will not engage with the clutch teeth 76 until the clutch teeth 80 and 81 are substantially in engagement, due to the aforedescribed abutting of the shoulder 91 with the clutch element 79.

When the shaft 14 tends to overrun the input shaft 12, the coil spring friction clutch 54 expands and tightly frictionally engages the clutch drum 40 which, through the helical threads 55 and 82, causes the clutch element 79 to be threaded to the left, from the position shown in Figure 1-A. Upon movement of the clutch element 79 to the left, the ramps 83 of clutch teeth 80 will engage the ramps 85 of clutch teeth 81. Engagement of the driving faces 84 and 86 of the clutch teeth 80 and 81 will take place at the moment that the shaft 14 tends to overrun the input shaft 12. Full engagement of the clutch teeth 80 and 81 will be completed in less than twenty degrees of overrunning of the shaft 14 relative to the input shaft 12.

Movement of the clutch element 79 to the left permits movement of the biased clutch hub 72 to the left. At the moment that the clutch teeth 80 and 81 begin to engage, the ramps 87 of clutch teeth 75 will engage the ramps 89 of clutch teeth 76. The instant before the clutch teeth 80 and 81 are in complete engagement, the clutch teeth 75 will be snapped substantially into driving relation with the clutch teeth 76. However, before the driving faces 88 and 90 of clutch teeth 75 and 76 are disposed in driving engagement, the input shaft 12 must be accelerated. Engagement of the clutch teeth 80 and 81, and 75 and 76, is effected without gear clash or shock. With the clutch teeth 80 engaging the clutch teeth 81 and the clutch teeth 75 engaging the clutch teeth 76, the intermediate shaft 14 is positively clutched to the input shaft 12 in either direction of rotation of the input shaft 12 relative to the intermediate shaft 14. The biasing force acting on the clutch hub 72 to the right, will maintain the clutch teeth 75 and 76, in engagement, and the shoulder 94 of the clutch hub 72, abutting the clutch element 79, will maintain the clutch teeth 80 and 81 in engagement.

If disengagement of the clutch mechanism 35 is desired, the clutch hub 72 is biased to the right. At the moment that the driving force is removed from the driving faces 88 and 90 of the clutch teeth 75 and 76, movement of the clutch hub 72 to the right will take place. Disengagement of the clutch teeth 80 and 81 is effected when the input shaft 12 tends to overrun the shaft 12, at which time the coil spring friction clutch 54 tends to wrap about the actuator ring 50, decreasing its frictional engagement with the clutch drum 49. The clutch element 79, through the helical threads 55 and 82, is then threaded to the right to the position shown in Figure 1-A.

From the foregoing description, it will be apparent to those skilled in the art that even though a shift is ordered by spring biasing the clutch hub 72 to the left, as viewed in Figure 1-A, full engagement of the clutch mechanism 35 will not take place until substantially synchronous speed is reached between the input shaft 12 and the intermediate shaft 14. When substantially synchronous speed is reached between the shafts 12 and 14, the clutch teeth 80 and 81 will engage for effecting drive in one direction of rotation of the shaft 12 relative to the shaft 14, and, almost simultaneously, the clutch teeth 75 and 76 will engage for effecting drive in the other direction of rotation of the shaft 12 relative to the shaft 14.

The rear end of the clutch 72 is formed with circumferentially radially extending jaw clutch or ratchet teeth 92, which are adapted to be disposed in engagement with circumferentially spaced radially extending jaw clutch teeth 93 formed integrally with the forward radial surface of the gear 43. The rear end of the clutch hub 72 is also formed with external straight splines 94 which co-operate with the internal straight splines 95 of an annular clutch element 96. The clutch element 96 is also formed with external helical threads or splines 97 which co-operate with the internal helical threads or splines 98 formed in the aforenoted actuator ring 62. A suitable annular shoulder 99 is formed in the clutch hub 72 and is adapted to normally abut the forward end of the clutch element 96. Formed integrally with the rear end of the clutch element 96 are circumferentially spaced radially extending jaw clutch or ratchet teeth 100 which are adapted to be disposed selectively in engagement with circumferentially spaced jaw clutch or ratchet teeth 101 formed integrally with the forward radial surface of the gear 43.

The clutch teeth 92, 93, 100, and 101 are formed with ramps and driving faces in the same manner as the aforedescribed clutch teeth 75, 76, 80, and 81.

The clutch mechanism 59 operates in substantially the same manner as the clutch mechanism 35 described fully above. When the gear 43 tends to overrun the intermediate shaft 14, the outer periphery of the coil spring friction clutch 66 tightly frictionally engages the inner periphery of the clutch drum 60, causing the clutch element 96 to be threaded to the right through the cooperating action of the helical threads 97 and 98. If the clutch hub 72 is spring biased to the right, the clutch teeth 92 will be disposed in engagement with the clutch teeth 93 at substantially the instant that the clutch teeth 100 are disposed in engagement with the clutch teeth 101. Since the engagement and disengagement of the clutch mechanism 59 takes place in substantially the same manner as the clutch mechanism 35, fully described above, it is believed that a detailed description of the operation of the clutch mechanism 59 is unnecessary for purposes of the present disclosure.

When the clutch mechanism 35 is fully engaged, direct drive is effected between the input shaft 12 and the intermediate shaft 14. When the clutch mechanism 35 is disengaged and the clutch mechanism 59 is fully engaged, drive is effected between the input shaft 12 and intermediate shaft 14 through the gear 38, gear portion 39, gear portion 42 and gear 43.

Formed integrally with the intermediate shaft 14, rearwardly of the ball bearing assembly 16, is a gear portion 102 which meshes with a gear 103 rotatably mounted on the forward end of the jackshaft or countershaft 23 immediately rearwardly of the ball bearing assembly 24. Axial movement of the gear 103 to the left, as viewed in Figures 1-A and 1-B, is restrained by means of a thrust washer 104. A suitable retaining nut 105 is threaded onto the forward end of the jackshaft 23 for properly locating the ball bearing assembly 24 on the jackshaft 23.

A clutch mechanism, indicated generally at 106, is provided for selectively positively clutching the gear 103 to the jackshaft 23. The clutch mechanism 106 comprises an axially rearwardly extending annular clutch drum 107, which is secured to the gear 103 by means of locating and drive pins 108. Assembled within the clutch drum 107 is an annular actuator ring 109 which is free to rotate relative to the clutch drum 107, but is restrained against axial movement therein by antifriction thrust washers 110 and 111. An external groove is formed in the actuator ring 109 and a coil spring clutch 112 is disposed therein. One end of the coil spring friction clutch 112 is anchored or secured to the actuator ring 109, while the other end of the coil spring 112 is free. The outer periphery of the coil spring 112 normally lightly frictionally engages the inner periphery of the clutch drum 107.

External straight splines 113 are formed in the jackshaft 23, immediately rearwardly of the gear 103, and an annular clutch hub 114, having internal straight splines 115, is mounted for axial movement on the splines 113. The clutch hub 114, at the forward end thereof, is formed with circumferentially spaced radially extending jaw clutch or ratchet teeth 116, which are adapted to be selectively disposed in engagement with circumferentially spaced radially extending jaw clutch or ratchet teeth 117 formed integrally with the radial rear edge of the gear 103. The clutch hub 114 is also formed with external straight splines 118 which engage with the internal straight splines 119 of an annular clutch element 120. The clutch element 120 is formed with external helical threads or splines 121 which co-operate with the internal helical splines or threads 122 formed in the actuator ring 109. Formed integrally with the clutch element 120, at the forward end thereof, are circumferentially spaced radially extending jaw clutch or ratchet teeth 123, which are adapted to be disposed selectively in engagement with circumferentially spaced radially extending jaw clutch or ratchet teeth 124 formed integrally with the rear radial surface of the gear 103.

Axial movement of the clutch hub 114 is adapted to be effected by means of a spring biased shift fork, which is disposed in the annular groove 130 formed in the outer periphery of the clutch hub 114. The clutch teeth 123 and 124 will automatically engage when the gear 103 tends to overrun the jackshaft 103. An annular shoulder 125 is formed integrally with the clutch hub 114 and is adapted to normally engage the rear end of the clutch element 120 for preventing engagement of the clutch hub 114 when the clutch element 120 is in a disengaged position, and for selectively preventing disengagement of the clutch element 120 when the clutch teeth 116 and 117 are in an engaged position. For purposes of the present disclosure, it is not believed that a detailed description of the operation of the clutch mechanism 106 is necessary, since it is substantially the same as the operation of the clutch mechanism 35 described fully hereinbefore.

The forward end of the sleeve 20 is formed with external straight splines 132 which co-operate with the internal straight splines 133 of an annular radially extending flange or ring member 134. A clutch mechanism, indicated at 131, is provided for clutching the sleeve 20, through the flange member 134, to the shaft 14. The clutch mechanism 131 comprises an axially forwardly extending annular clutch drum 135 secured to the outer periphery of the flange 134 by means of locating or drive pins 136. Assembled within the clutch drum 135 is an annular shift actuator ring 137 which is free to rotate within the clutch drum 135, but is restrained against axial movement therein by antifriction thrust washers 138 and 139. An external annular groove is formed in the actuator ring 137, and disposed therein is a coil spring friction clutch 140 which at its one end is fixed in the actuator ring 137 and at its other end is free. The coil spring friction clutch 140 normally lightly frictionally engages the inner periphery of the clutch drum 135.

The rear end of the intermediate shaft 14 is formed with external straight splines 141, upon which are mounted the internal straight splines 142 of an annular clutch hub 143. The clutch hub 143 is formed with an annular external groove 144', which is adapted to receive a spring biased shift fork. The clutch hub 143 of the clutch mechanism 131 is adapted to be moved in unison axially with the clutch hub 114 of the clutch mechanism 106.

The clutch hub 143, at the rear end thereof, is formed with circumferentially spaced radially extending jaw clutch or ratchet teeth 144, which are adapted to be disposed selectively in engagement with circumferentially spaced radially extending jaw clutch or ratchet teeth 145 formed integrally with the forward radial surface of the flange member 134. External straight splines 146 are formed on the clutch hub 143 and are adapted to co-operate with the internal straight splines 147 of an annular clutch element 148. The clutch element 148, at the rear end thereof, is formed with circumferentially spaced radially extending jaw clutch or ratchet teeth 149, which are adapted to be disposed selectively in engagement with circumferentially spaced radially extending jaw clutch or ratchet teeth 150 formed integrally with the forward radial surface of the flange member 134. Formed on the outer periphery of the clutch element 148 are external helical threads or splines 151, which co-operate with the internal helical threads or splines 152 formed in the actuator ring 137. A suitable annular shoulder 154 is formed in the clutch hub 143 and normally engages the forward end of the clutch element 148.

The operation of the clutch mechanism 131 is substantially the same as the operation of the clutch mechanism 59 described above. The clutch element 148 is adapted to be threaded automatically to the right from the position shown in Figure 1–B, when the flange member 134, sleeve member 20, and clutch drum 135 tend to overrun the intermediate shaft 14.

The aforedescribed straight splines 113, formed in the jackshaft 23, adjacent their rear ends, are adapted to receive the internal straight splines 161 of a gear 162, which is retained against axial movement by means of a thrust washer 163 and a suitable nut 164 threaded onto the jackshaft 23. The gear 162 meshes with a gear 165 which is suitably journaled on the forward end of the sleeve member 20, immediately rearwardly of the radial flange member 134. The gear 165 is held against axial movement relative to the sleeve member 20 by means of external straight splines 166 formed in the sleeve member 20, and the aforementioned flange member 134 is held in position by a thrust washer 160.

The jackshaft 23, adjacent the rear end thereof, is formed with a gear portion 167 which meshes with a gear 168 journaled on the sleeve member 20, adjacent the rear end thereof. The gear 168 is restrained against axial movement by means of external clutch teeth 169 formed in the rear end of the sleeve member 20 and by a thrust washer 170 which is retained in place by a spring ring 171. A clutch mechanism, indicated generally at 172, is provided for selectively clutching the gear 165 to the sleeve member 20, and a clutch mechanism, indicated generally at 173, is provided for selectively clutching the gear 168 to the sleeve member 20.

The clutch mechanism 172 comprises an axially rearwardly extending annular clutch drum 174 secured to the gear 165 by means of drive and locating pins 175. Assembled within the clutch drum 174 is an annular actuator ring 176 which is free to rotate within the clutch drum 174, but is restrained against axial movement therein by means of antifriction thrust washers 177 and 178. An external annular groove 179 is formed in the outer periphery of the actuator ring 176, and disposed in the groove 179 is a coil spring friction clutch 180, which at one end is anchored in the actuator ring 176 and at its other end is free. The outer periphery of the coil spring friction clutch 180 normally lightly frictionally engages the inner periphery of the clutch drum 174.

The internal straight splines 186 of a clutch hub 187 are disposed in meshing engagement with the external straight splines 166 formed in the sleeve member 20. The clutch hub 187 is adapted to be moved axially relative to the sleeve member 20. Formed at the forward end of the clutch hub 187 are circumferentially spaced radially extending jaw clutch or ratchet teeth 188, which are adapted to be disposed selectively in engagement with circumferentially spaced radially extending jaw clutch or ratchet teeth 189 formed integrally with the rear radial surface of the gear 165. Also formed at the forward end of the clutch hub 187 are external straight splines 190 which co-operate with the internal straight splines 191 of an annular clutch element 192. The forward end of the clutch element 192 is formed with circumferentially spaced radially extending jaw clutch or ratchet teeth 193, which are adapted to be disposed selectively in engagement with circumferentially spaced radially extending jaw clutch or ratchet teeth 194 formed integrally with the rear radial surfaces of the gear 165. The rear end of the clutch element 192 normally abuts an annular shoulder 195 formed in the clutch hub 187. External helical threads or splines 196 are formed in the clutch element 192, and the threads 196 co-operate with the internal helical splines or threads 197 formed in the actuator ring 176. The clutch element 192 is threaded automatically to the left for engaging the clutch teeth 193 and 194 when the sleeve member 20 tends to overrun the gear 165.

An axially forwardly extending annular clutch drum 201 is secured to the gear 168 by means of locating and drive pins 202. Assembled within the clutch drum 201 is an annular actuator ring 203, which is free to rotate within the clutch drum 201, but is restrained against axial movement therein by means of antifriction thrust washers 204 and 205. An external annular groove 206 is formed in the actuator ring 203 and disposed in the groove 206 is a coil spring friction clutch 207, which at one end is anchored in the actuator ring 203 and at its other end is free. The outer periphery of the coil spring friction clutch 207 normally lightly frictionally engages the inner periphery of the clutch drum 201.

The aforedescribed clutch hub 187 at its rear end is formed with a plurality of circumferentially spaced radially extending jaw clutch or ratchet teeth 208, which are adapted to be disposed selectively in engagement with circumferentially spaced radially extending jaw clutch or ratchet teeth 209 formed in the forward radial surface of the gear 168. Also formed in the clutch hub 187, at the rear end thereof, are external straight splines 210 which are adapted to cooperate with the internal straight splines 211 of an annular clutch element 212. The forward end of the clutch element 212 is adapted to normally abut an annular shoulder 213 formed in the clutch hub 187. The rear end of the clutch element 212 is formed with circumferentially spaced radially extending jaw clutch or ratchet teeth 214, which are adapted to be selectively disposed in engagement with circumferentially spaced radially extending jaw clutch or ratchet teeth 215 formed integrally with the forward radial surface of the gear 168. The clutch element 212 is also formed with external helical threads or splines 216, which cooperate with the internal helical threads or splines 217 formed in the actuator ring 203. The clutch element 212 is threaded automatically to the right for engaging the clutch teeth 208 and 209 when the gear 168 tends to overrun the sleeve member 20.

The gear portion 167 formed at the rear end of the jackshaft 23 has meshing engagement with a reverse idler gear portion 226, shown in dotted lines for the sake of clarity. The reverse idler gear portion 226 forms part of a compound gear 227, which is mounted on an idler shaft 228 suitably journaled in bearings (not shown) retained within the transmission housing 10. The compound gear 227, adjacent its rear end, is formed with a gear portion 229, which has meshing engagement with a gear 230 rotatably mounted on needle bearings 231 arranged about the outer periphery of the output shaft 17, immediately forwardly of the ball bearing assembly 19. The needle bearings 231 are held in axial position by thrust washers 232 and 233.

The output shaft 17, intermediate of the washer 232 and the rear end of the sleeve member 20, is formed with external straight splines 234 which receive the internal straight splines 235 of an axially fixed annular ring member 236. External straight splines 237 are formed in the ring member 236 and are of the same proportions as the aforementioned clutch teeth 169 formed at the rear end of the sleeve member 20.

A suitable annular clutch collar member 238 is formed with internal straight splines 239 which mate with the external splines 237, and are adapted to engage the clutch teeth 169 when the clutch collar member 238 is shifted to the left from the position shown in Figure 1-B. The clutch collar member 238 is also formed at its rear end with circumferentially spaced radially extending clutch teeth 240 which are adapted to be selectively disposed in engagement with circumferentially spaced radially extending clutch teeth 241 formed integrally with the forward radial surface of the gear 230. The clutch collar member 238 is, in addition, formed with an annular external groove 242 which is adapted to receive a shift fork to be described hereinafter.

When the clutch collar member 238 is in the position shown in Figure 1-B, neither forward nor reverse drive is effected to the output shaft 17, and the transmission is thus in a neutral position. When the clutch collar member 238 is shifted to the left from the position shown in Figure 1-B, until the internal splines 239 mate with the external clutch teeth 169, the sleeve 20 is clutched to the output shaft 17 and forward drive is effected to the latter. When the clutch collar member 238 is shifted to the right from the position shown in Figure 1-B, until the clutch teeth 240 are disposed in engagement with the clutch teeth 241, the gear 230 is clutched to the output shaft 17, and reverse drive is effected to the latter.

The transmission of my present invention provides for six forward drive ratios between the input shaft 12 and the output shaft 17. These forward drive ratios may be selected by moving the clutch collar member 238 to the left and actuating the clutch mechanisms in the following sequence:

| Ratio | Clutch Mechanisms Engaged |
| --- | --- |
| First | 59–106–173 |
| Second | 35–106–173 |
| Third | 59–106–172 |
| Fourth | 35–106–172 |
| Fifth | 59–131–172 |
| Sixth | 35–131–172 |

Two reverse drive ratios may be provided between the input shaft 12 and the output shaft 17 after the clutch collar member 238 has been moved to the right. Low speed reverse drive is effected by engaging the clutch mechanisms 59, 106, and 173, and high speed reverse drive is effected by engaging the clutch mechanisms 35, 106, and 173.

I shall now describe in detail the control mechanism of my present invention, which is particularly adapted for use in connection with the above described transmission assembly.

Mounted within the transmission housing 10, adjacent one side thereof, is a shift rail 243. The shift rail 243 is fixed within inwardly extending axially spaced bosses 244, 245, 246, and 247. Slidably mounted on the shift rail 243, intermediate of the bosses 244 and 245, is the hub portion 248 of a shift fork 249 which is disposed in engagement with the aforedescribed annular groove 74 formed in the clutch hub 72 associated with the clutch mechanisms 35 and 59. A suitable coil spring 250 is disposed concentrically about the shift rail 243 and extends between the boss 244 and a washer 251, which abuts the hub 248. The shift fork 249 is thus normally biased to the right to the position shown in Figure 4. In this position of the shift fork 249, the clutch mechanism 59 is in an engaged position and the clutch mechanism 35 is in a disengaged position. A suitable ring 252 is secured about the shift rail 243 and provides a stop for limiting axial movement of the shift fork 249 to the left from the position shown in Figure 4.

Slidably mounted on the shift rail 243, intermediate of the bosses 246 and 247, is the hub 253 of a shift fork 254 which is disposed in engagement with the groove 144 formed in the aforedescribed clutch hub 143 associated with the clutch mechanism 131. As described above, the clutch hub 114 of the clutch mechanism 106 is adapted to move conjointly axially with the clutch hub 143. With the shift fork 254 in the position shown in Figure 4, the clutch mechanism 131 is in a disengaged position, while the clutch mechanism 106 is in an engaged position.

Also slidably mounted on the shift rail 243, intermediate of the bosses 246 and 247, is the hub 255 of a shift fork 256 which is disposed in engagement with the annular groove 185 formed in the clutch hub 187 associated with the clutch mechanisms 172 and 173. With the shift fork 256 in the position shown in Figure 4, the clutch mechanism 173 is in an engaged position and the clutch mechanism 172 is in a disengaged position.

Disposed concentrically about the shift rail 242, intermediate of the hubs 253 and 255, is a coil spring 257. The spring 257, at one end, engages a washer 258 which abuts the hub 253 and the spring 257, at the other end, engages a washer 259 which abuts the hub 255. It will thus be apparent that the shift forks 254 and 256 are normally maintained in the position shown in Figure 4 by virtue of the spring 257. A ring member 260 is disposed about the shift rail 243, intermediate of the washers 258 and 259, and acts as a stop for limiting axial movement of the shift forks 254 and 256 toward each other.

Mounted within a control housing 261, suitably secured to the outside of the transmission housing 10, is a ratio selector mechanism which is adapted to selectively condition the shift forks 249, 254, and 256 for axial shifting movement.

The ratio selector mechanism comprises a selector cam bar 262 which is mounted within the control housing 261 on rollers 263. A sleeve member 264 is mounted within the control housing 261, and the longitudinal axis of the sleeve member 264 extends perpendicular to the lengthwise axis of the cam bar 262. Mounted within the sleeve member 264 is a coil spring 265, which at its upper end is disposed in abutting engagement with a cap member 266 fixed in the sleeve member 264. The spring 265 at its lower end engages the inner lower end of a tubular plunger 267, which at its outer lower end carries a roller 268. The roller 268 is adapted to engage one of a plurality of notches 269 formed in the upper edge of the cam bar 262 for biasing the latter against the rollers 263 and to provide for snap action when the cam bar 262 is shifted rectilinearly from one position to another.

Shafts 270, 271, and 272 are mounted in the control housing 261 and extend transversely of the cam bar 262, immediately thereabove. Fixed to the one end of the shafts 270, 271, and 272, respectively, are the housings 273, 274, and 275 of plunger assemblies, indicated generally at 276, 277, and 278. Mounted in the housings 273, 274, and 275 are plungers 279, 280, and 281, which are normally biased outwardly of the housings by means of coil springs 282, 283, and 284 located in the housings 273, 274, and 275. Movement of the plungers 279, 280, and 281 within the housings 273, 274, and 275 is limited by the stop pins 285, 286, and 287 fixed in the respective housings, adjacent the upper ends thereof. The lower ends of the plungers 279, 280, and 281 are provided with rollers 288, 289, and 290. The roller 288 of plunger 279 is biased into engagement with one of a plurality of notches 291 formed in the cam bar 262 or the crests intermediate thereof. The rollers 289 and 290 of plungers 280 and 281 are biased into engagement with a notch 292 formed in the cam bar 262 or the upper edge of the latter.

Secured to the opposite ends of the shafts 270, 271, and 272 are shift levers 293, 294, and 295. The shift levers 293, 294, and 295 project generally downwardly and the lower ends thereof are disposed into slots 301, 302, and 303, formed respectively in the shift hubs 248, 253, and 255.

Rectilinear movement of the cam bar 262 is effected through linkage means comprising a link 304, which is pivotally mounted by a pin 305 to the rear end of the cam bar 262. The other end of the link 304 is pivotally mounted by a pin 306 to the end of a crank arm 307 secured to a shaft 308, which is preferably adapted to be rotated manually by the operator of the vehicle in which the transmission of my present invention is incorporated.

Assuming that the clutch mechanism 59 is engaged and the shift fork 249 is in the position shown in Figure 4, one drive ratio is provided between the input shaft 12 and the intermediate shaft 14. If a second drive ratio is desired, the operator of the vehicle need only rotate the shaft 308, causing clockwise rotation of the crank arm 307 which, through the link 304, causes the cam bar 262 to move to the left from the position shown in Figure 5. When a high point of the cam bar 262 is moved beneath the roller 288 of the plunger 279, the latter is forced upwardly, thereby compressing the spring 282 against the upper end of the housing 273 which spring loads the latter for rotation in a clockwise direction, as viewed in Figure 5. Since the housing 273 and the lever 293 are secured to a common shaft 270, the lever 293 will be spring loaded in a clockwise direction whenever the housing 273 is spring loaded in a clockwise direction. Spring loading of the lever 293 also spring loads the hub 248, tending to urge the latter to the left from the position shown in Figure 4. The rotational force exerted by the spring 282 mounted in the housing 273 is greater than the force exerted by the spring 250 mounted between the boss 244 and the hub 248. Thus, if no driving force is being exerted through the clutch mechanism 59, the clutch hub 72 will move to the left until the shoulder 91 engages the rear end of the clutch element 79. As fully described above, at the instant the clutch element 79 is threaded to the left from the position shown in Figure 1-A, the spring loaded clutch hub 72 will be shifted to the left from the position shown in Figure 1-A, and the clutch mechanism 35 will be fully engaged in both directions of rotation of the input shaft 12 relative to the intermediate shaft 14.

If the clutch mechanism 59 is in engagement and the shift fork 249 is in the position shown in Figure 4, the clutch mechanism 59 will not be disengaged when the shift fork hub 248 is spring loaded as long as there is a driving load on the clutch teeth of the clutch mechanism 59. In order to release the driving load on the clutch teeth of the clutch mechanism 59, when it is desired to effect disengagement of the latter, I have provided means, which I shall now describe in detail, for disengaging the main clutch and thus interrupting drive between the prime mover and the input shaft 12.

The last referred to main clutch actuating means comprises an insulation strip 309 which is mounted in the control housing 261, above the plunger assemblies 276, 277, and 278. The insulation strip 309 provides support for a plurality of switches numbered 310 through 315. As shown in Figures 4 and 6, the switch blades 316, 317, and 318 of switches 310, 312, and 314 are interconnected by a terminal bar 319. The switch blades 320, 321, and 322 of switches 311, 313, and 315 are interconnected by a terminal bar 323.

The switches 310 through 315, respectively, are provided with upper contacts numbered 324 through 329 and lower contacts numbered 330 through 335. The switch blades 316 through 322 are provided, respectively, with contacts 336 through 341. The contact 330 of the switch 310 has connection through a conductor or line 346 to the contact 325 of the switch 311, and the contact 324 of switch 310 has connection through a line or conductor 347 to the contact 331 of switch 311. The contact 332 of switch 312 has connection through a line or conductor 348 to the contact 327 of switch 313, and the contact 326 of switch 312 has connection through a line or conductor 349 to the contact 333 of switch 313. The contact 334 of switch 314 has connection through a line or conductor 350 to the contact 329 of switch 315, and the contact 328 of switch 314 has connection through a line or conductor 351 with the contact 335 of switch 315.

The terminal bar 319 has suitable connection to ground, as at 361, and the terminal bar 323 has connection through a line 362 with the coil 363 of a solenoid actuated valve, indicated generally at 364. The coil 363 is also connected through a line 365 to the positive terminal of a battery 366. The negative terminal of the battery 366 is connected through a line 367 to ground, as at 368.

A plunger 369 is mounted for sliding movement in the coil 363, and the plunger 369, at its lower end, is adapted to effect opening and closing of the valve 364. The valve 364, at one end, communicates, through a conduit 372, with a source of vacuum, and, at the other end, communicates, through a conduit 373, with a chamber 374 in which is disposed a diaphragm 375. Secured to the diaphragm 375 is the one end of a rod 376 which extends outwardly of the chamber 374 and is pivotally mounted at 377 to a draw bar 378, intermediate of the ends thereof. The draw bar 378 is pivotally secured at 379 to a link 380, which has connection with the brake actuating mechanism associated with the brake band 41. The brake actuating mechanism is of known and conventional construction, in view of which it is not believed necessary to show and describe the same. The draw bar 378 is also pivotally secured at 381 to a link 382, which, as shown in Figure 1-A, is pivotally secured at 383 to the clutch release hub 8.

When the coil 262 of the solenoid actuated valve 264 is energized, the plunger 369 is retracted upwardly and the conduits 372 and 373 are placed in communication. A vacuum is thus created within the chamber 374, at the right side of the diaphragm 375, as viewed in Figure 6. The diaphragm is thereupon drawn to the right, as is the rod 376, draw rod 378, and links 380 and 382. Movement of the links 380 and 382 to the right causes the main friction disc clutch to be disengaged and the brake bands 41 to be simultaneously disposed in braking engagement with the grooves 40, thereby braking the jackshaft 26 against rotation.

The following is a description of the operation of the above described transmission control means of my present invention, and it is intended that this description be read in connection with the chart of operations shown in Figure 7.

With the clutch mechanisms 59, 106 and 173 in full engagement, first ratio forward drive is effected between the input shaft 12 and the output shaft 17. The electrical switches 210 through 315 are in the positions shown in Figure 6. If it is desired to shift into second ratio forward drive, the shaft 308 is rotated in a clockwise direction, whereupon the crank arm 307 causes, through the link 304, movement of the cam bar 262 to the left, as viewed in Figure 5. Movement of the cam bar 262 to the left disposes one of the high points thereof beneath the roller 288 of the plunger 279, forcing the latter upwardly against the spring 282, thereby spring biasing the housing 273 and the lever 293 in a clockwise direction, as has been fully described above. As the plunger 279 of the plunger assembly 276 is urged upwardly, the upper end of the plunger 279 engages the switch arm 316 of switch 310, which causes the contacts 324 and 336 to separate and the contacts 330 and 336 to engage. With the contacts 330 and 336 in engagement, the electrical circuit between ground and the solenoid coil 363 is completed, and the solenoid coil 363 is electrically energized, which opens the valve 364. As a result of the valve 364 being opened, the main friction disc clutch is disengaged and the brake bands 41 are applied, thus momentarily braking the countershaft 26 against rotation, as described above. This removes the driving force on the clutch teeth of the clutch mechanism 59, thus permitting the spring loaded shift fork 249 to shift the clutch hub 72 to the left to the position shown in Figure 1-A.

The clutch hub 72 is momentarily halted in the position shown in Figure 1-A, due to the shoulder 91 engaging the clutch element 79. As the clutch element 79 is threaded to the left, in the manner described above, the spring loaded shift fork 249 causes the clutch hub 72 to shift further to the left. At substantially synchronous speed of the input shaft 12 and the intermediate shaft 14, the clutch teeth 75 and 80 are snapped into engagement, respectively, with clutch teeth 76 and 81. The clutch mechanism 35 is thereupon fully engaged and, as described hereinbefore, second ratio forward drive is established between the input shaft 12 and the output shaft 17.

As the clutch hub 72 moves to the left, the plunger assembly 276 rotates clockwise causing the plug member 296, fixed in the upper end of the plunger housing 273, to engage the switch blade 320 of switch 311, which causes the contacts 325 and 337 to separate and the contacts 331 and 337 to engage. When the contacts 325 and 337 are separated, the electrical circuit to the solenoid coil 363 is opened and the plunger 369 is permitted to move downwardly, interrupting communication between the conduits 372 and 373 and simultaneously permitting pressure to return to the chamber 374. When pressure is returned to the chamber 374, the diaphragm 375, rod 376, draw rod 378, and links 380 and 382 move to the left from the position shown in Figure 6, whereupon the main friction disc clutch is reengaged and the brake bands 41 released. The transmission is now in second ratio forward drive.

Figure 5:
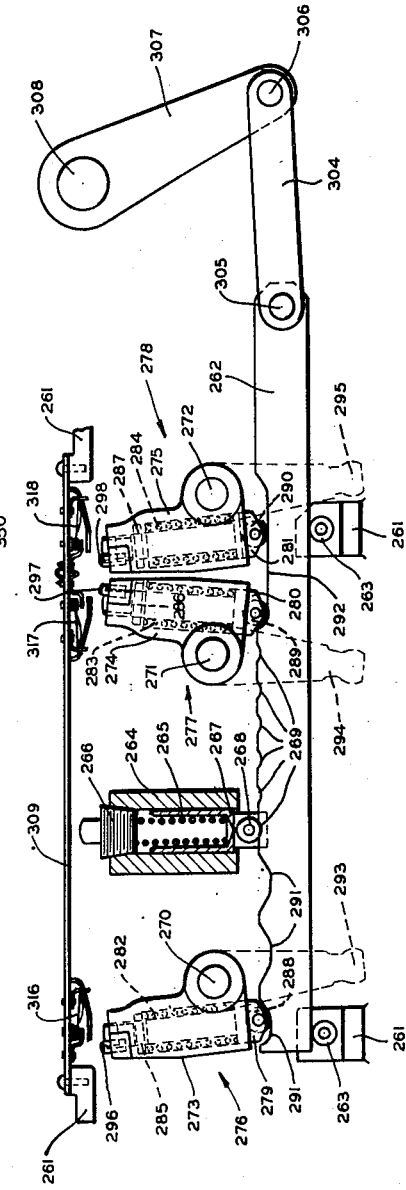
Figure 5 is a side elevational view of the control means of Figure 4.

If it should be desired to shift back to first ratio forward drive, the shaft 308 is rotated counterclockwise, thereby causing the crank arm 307 to rotate counterclockwise, which effects, through the link 304, movement of the cam bar 262 to the right to the position shown in Figure 5. As the high point of the cam bar 262 is removed from engagement with the roller 288 of plunger 279, the plunger 279 is biased downwardly by means of the spring 282 and the roller 288 is disposed in the end notch 291. The upper end of the plunger 279 is also removed from engagement with the switch blade 316 of switch 310, causing the contacts 330 and 336 to separate and the contacts 324 and 326 to reengage. The solenoid circuit is again completed and the solenoid coil 363 energized. The valve 364 is opened and, in the manner above described, the main friction disc clutch is disengaged and the brake shoes 41 applied, thus braking the jackshaft 26 and removing the driving force from the clutch teeth of the clutch mechanism 35.

The spring 250, mounted between the boss 244 and the hub 248 of the shift fork 249, causes the latter to move to the right toward the position shown in Figure 4. The clutch hub 72 is simultaneously moved to the right until the shoulder 99 engages the clutch element 96. This movement of the shift fork 249 causes the plunger assembly 276 to rotate counterclockwise, as viewed in Figure 5, thereby withdrawing the plug member 296 from engagement with the switch blade 320 of switch 311. At this point, the contacts 331 and 337 are separated and the contacts 325 and 337 are engaged. The electrical circuit to the solenoid coil 363 is opened and the plunger 369 is permitted to move downwardly, interrupting communication between the conduits 372 and 373, whereupon the main friction disc clutch is reengaged and the brake bands 41 released, thereby permitting the engine to accelerate drive shaft 12 and gear 43 until substantially synchronous rotation with shaft 14 is reached. At substantially synchronous speed of the gear 43 and the intermediate shaft 14, the clutch element 96 is threaded to the right from the position shown in Figure 1-A, and the clutch hub 72 is simultaneously moved to the right under the force of spring 250, acting through the shift fork 249, until the clutch teeth 92 and 100 are snapped into engagement, respectively, with clutch teeth 93 and 101. The clutch mechanism 59 is thereupon fully engaged.

As the clutch hub 72 moves to the right, the plunger assembly 276 is rotated counterclockwise back to the position shown in Figure 5, at which time the plug member 296, fixed in the upper end of the plunger housing 273, is withdrawn from engagement with the switch blade 320 of switch 311. The contacts 331 and 337 are thereupon separated and the contacts 325 and 337 are engaged, as a result of which, the electrical circuit embodying the solenoid coil 363 is opened and the latter deenergized. Deenergization of the coil 363 permits the main friction disc clutch to again reengage and the brake bands 41 to return to a nonbraking position. First ratio forward drive is then established through the transmission.

The aforenoted plunger assembly 277 is associated with the switches 312 and 313, and the plunger assembly 278 is associated with the switches 314 and 315. The plunger assemblies 277 and 278 operate in a similar manner as the plunger assembly 276 described in detail hereinbefore.

It is believed that with the above description of several of the numerous conditions of operation of the transmission control means of my present invention, it will be unnecessary to describe each of the remaining conditions in detail.

From the above description, it will be readily appreciated by those skilled in the art, that I have provided a transmission and control means therefor which will permit any desired drive ratio to be selected, regardless of the relative speeds between the rotating members to be clutched together, but which will prevent the selected drive ratio from becoming operative until the rotating members to be clutched together are rotating substantially in synchronism.

In the operation of the above described transmission, all shifts from one speed ratio to a faster speed ratio are made while the vehicle coasts. It will be apparent that the above described control means interrupts drive to the main drive shaft to allow the pre-selected clutch mechanism to be disengaged and during a shift to a faster speed ratio applies and holds a brake acting on the main drive shaft until the speed change has been completed. By interrupting drive to the main drive shaft and simultaneously braking the latter, the speed of the drive shaft is reduced and synchronized with that of the driven member to be clutched thereto. The shift is thus quickly completed.

When a shift from one speed ratio to a slower speed ratio is to be made, drive to the main drive shaft is momentarily interrupted and the brake applied momentarily thereto until the pre-selected clutch mechanism is disengaged. At the moment of disengagement, the brake is released and drive is reestablished to the drive shaft which causes the speed of the drive shaft to quickly increase to synchronize with the speed of the driven member to be clutched thereto. It will be appreciated, from the foregoing description, that the engine is utilized to facilitate the shifts in speed ratios thus reducing the time required to complete any particular shift to a minimum.

Now, while I have shown and described what I believe to be a preferred embodiment of my present invention, it will be understood that various modifications and rearrangements may be made therein without departing from the spirit and scope of my present invention.

I claim:

1. In combination, a drive member, a driven member, a clutch element for clutching the drive and driven members together, a shift fork for effecting movement of the clutch element, first spring means associated with said shift fork for normally biasing said clutch element to a disengaged position, a pivotally mounted plunger housing, a lever operatively interconnecting said plunger housing and said shift fork, a spring biased plunger extending through said plunger housing, means for effecting movement of said plunger whereby said plunger housing is spring loaded for pivotal movement and said clutch element is biased to an engaged position, and said spring loaded plunger housing exerting a greater force than said first spring means.

2. In combination, a drive member, a driven member, a clutch element for clutching the drive and driven members together, a shift fork for effecting movement of said clutch element, first spring means associated with said shift fork for normally biasing said clutch element to a disengaged position, a pivotally mounted plunger housing, a lever operatively interconnecting said plunger housing and said shift fork, a spring biased plunger extending through said plunger housing, a cam bar for selectively effecting movement of said plunger whereby said plunger housing is spring loaded for pivotal movement and said clutch element is biased to an engaged position, and said spring loaded plunger housing exerting a greater force than said first spring means.

3. In combination, a drive shaft, a driven shaft, a gear driven from said drive shaft and journaled on said driven shaft, a compound clutch element adapted in one position to clutch said gear to said driven shaft and in another position to clutch said driven shaft to said drive shaft, a shift fork for effecting movement of said clutch element, first spring means associated with said shift fork for normally biasing said clutch element into a first position clutching said gear and said driven shaft together, a pivotally mounted plunger housing, a lever operatively interconnecting said plunger housing and said shift fork, a spring biased plunger extending through said plunger housing, a cam bar for selectively effecting movement of said plunger whereby said plunger housing is spring loaded for pivotal movement and said clutch element is disengaged from said first position and biased into a second position clutching said drive and driven shafts together, and said spring loaded plunger housing exerting a greater force than said first spring means.

4. In combination, a drive shaft, a driven shaft, a gear driven from said drive shaft and journaled on said driven shaft, a compound clutch element non-rotatably mounted on said driven shaft and axially movable therealong, said compound clutch element being adapted in one position to clutch said gear to said driven shaft in one direction of rotation of said gear relative to said driven shaft and in another position to clutch said drive and driven shafts together in one direction of rotation of said drive shaft relative to said driven shaft, a first clutch element non-rotatably mounted on said compound clutch element and axially movable therealong, said first clutch element being adapted to clutch said gear to said driven shaft in the other direction of rotation of said gear relative to said driven shaft, a second clutch element non-rotatably mounted on said compound clutch element and axially movable therealong, said second clutch element being adapted to clutch said drive and driven shafts together in the other direction of rotation of said drive shaft relative to said driven shaft, means for effecting engagement of said first clutch element upon rotation of said gear in one direction relative to said driven shaft and for effecting disengagement of said first clutch element upon rotation of said gear in the other direction relative to said driven shaft, means for effecting engagement of said second clutch element upon rotation of said drive shaft in one direction relative to said driven shaft and for effecting disengagement of said second clutch element upon rotation of said drive shaft in the other direction relative to said driven shaft, a shift fork for effecting movement of said compound clutch element, first spring means associated with said shift fork for normally biasing said compound clutch element into a first position clutching said gear and said driven shaft together when said first clutch element is being engaged, a pivotally mounted plunger housing, a lever operatively interconnecting said plunger housing and said shift fork, a spring biased plunger extending through said plunger housing, means for selectively effecting movement of said plunger whereby said plunger housing is spring loaded for pivotal movement and said compound clutch element is disengaged from said first position and biased into a second position clutching said drive and driven shafts together when said second clutch element is being engaged, and said spring loaded plunger housing exerting a greater force than said first spring means.

5. For use with a drive member, main clutch means operatively connected to the drive member, a driven member, and a clutch element for clutching the drive and driven members together, control means comprising, a shift fork for effecting movement of the clutch element, a pivotally mounted plunger housing, a lever operatively interconnecting said plunger housing and said shift fork, vacuum responsive means for effecting disengagement of the main clutch means, solenoid actuated valve means adapted when electrically energized to render said vacuum responsive means operative, electric circuit means including switch means for said solenoid actuated valve means, a spring biased plunger extending through said plunger housing, means for selectively effecting movement of said plunger whereby said plunger housing is spring loaded for pivotal movement and the clutch element is biased to an engaged position, and said plunger when moved effecting actuation of said switch means for closing said electric circuit means to thereby electrically energize said solenoid actuated valve means when the clutch element is being engaged.

6. In combination, a drive shaft, main clutch means operatively connected to said drive shaft, brake means for said drive shaft, a driven shaft, a gear driven from said drive shaft and journaled on said driven shaft, a compound clutch element adapted in one position to clutch said gear to said driven shaft and in another position to clutch said driven shaft to said drive shaft, a shift fork for effecting movement of said clutch element, first spring means associated with said shift fork for normally biasing said clutch element into a first position clutching said gear and said driven shaft together, a pivotally mounted plunger housing, a lever operatively interconnecting said plunger housing and said shift fork, vacuum responsive means for effecting disengagement of said main clutch means and actuation of said brake means, solenoid actuated valve means adapted when electrically energized to render said vacuum responsive means operative, electric circuit means including switch means for said solenoid actuated valve means, a spring biased plunger extending through said plunger housing, means for selectively effecting movement of said plunger whereby said plunger housing is spring loaded for pivotal movement thereby causing said clutch element to be disengaged from said first position and biased into a second position clutching said drive and driven shafts together, and said plunger when moved effecting actuation of said switch means for closing said electric circuit means to thereby electrically energize said solenoid actuated valve means when said clutch element is shifted between said first and second positions.

7. In combination, a drive shaft, main clutch means operatively connected to said drive shaft, brake means for said drive shaft, a driven shaft, a gear driven from said drive shaft and journaled on said driven shaft, a compound clutch element adapted in one position to clutch said gear to said driven shaft and in another position to clutch said driven shaft to said drive shaft, a shift fork for effecting movement of said clutch element, first spring means associated with said shift fork for normally biasing said clutch element into a first position clutching said gear and said driven shaft together, a pivotally mounted plunger housing, a lever operatively interconnecting said plunger housing and said shift fork, vacuum responsive means for effecting disengagement of said main clutch means and actuation of said brake means, solenoid actuated valve means adapted when electrically energized to render said vacuum responsive means operative, electric circuit means for said solenoid actuated valve means, said electric circuit means including first and second switches connected in series, said first switch being normally open and said second switch normally closed, a spring biased plunger extending through said plunger housing, means for selectively effecting movement of said plunger whereby said plunger housing is spring loaded for pivotal movement thereby conditioning said clutch element for disengagement from said first position and movement toward said second position for clutching said drive and driven shafts together, said plunger when moved effecting closing of said first switch for closing said electric circuit means to thereby electrically energize said solenoid actuated valve means and effect disengagement of said main clutch means whereby the driving force between said clutch element and said gear is removed permitting said clutch element to move to said second position under the biasing force of the spring loaded plunger housing, and a portion of said plunger housing being adapted to open said second switch and said electric circuit means to permit reengagement of said main clutch means and release of said brake means when said clutch element is moved into said second clutching position.

8. In combination, a drive member, main clutch means operatively connected to said drive member, a driven member, a clutch element for clutching said drive and driven members together, a shift fork for effecting movement of the clutch element, a pivotally mounted plunger housing, a lever operatively interconnecting said plunger housing and said shift fork, vacuum responsive means for effecting disengagement of said main clutch means, solenoid actuated valve means adapted when electrically energized to render said vacuum responsive means operative, electric circuit means including first and second switches wired in series, said first switch being normally open and said second switch normally closed, a spring biased plunger extending through said plunger housing, means for selectively effecting movement of said plunger whereby said plunger housing is spring loaded for pivotal movement thereby conditioning said clutch element for engagement, said plunger when moved effecting closing of said first switch for closing said electric circuit means to thereby electrically energize said solenoid actuated valve means and effect disengagement of said main clutch means permitting said clutch element to engage, and a portion of said plunger housing being adapted to open said second switch and said electric circuit means to permit reengagement of said main clutch means when said clutch element is in a full clutching position.

9. In combination, a drive shaft, main clutch means operatively connected to said drive shaft, brake means for said drive shaft, a driven shaft, a gear driven from said drive shaft and journaled on said driven shaft, a compound clutch element non-rotatably mounted on said driven shaft and axially movable therealong, said compound clutch element being adapted in one position to clutch said gear to said driven shaft in one direction of rotation of said gear relative to said driven shaft and in another position to clutch said drive and driven shafts together in one direction of rotation of said drive shaft relative to said driven shaft, a first clutch element non-rotatably mounted on said compound clutch element and axially movable therealong, said first clutch element being adapted to clutch said gear to said driven shaft in the other direction of rotation of said gear relative to said driven shaft, a second clutch element non-rotatably mounted on said compound clutch element and axially movable therealong, said second clutch element being adapted to clutch said drive and driven shafts together in the other direction of rotation of said drive shaft relative to said driven shaft, means for effecting engagement of said first clutch element upon rotation of said gear in one direction relative to said driven shaft and for effecting disengagement of said first clutch element upon rotation of said gear in the other direction relative to said driven shaft, means for effecting engagement of said second clutch element upon rotation of said drive shaft in one direction relative to said driven shaft and for effecting disengagement of said second clutch element upon rotation of said drive shaft in the other direction relative to said driven shaft, a shift fork for effecting movement of said compound clutch element, first spring means associated with said shift fork for normally biasing said compound clutch element into a first position clutching said gear and said driven shaft together when said first clutch element is being engaged, a pivotally mounted plunger housing, a lever operatively interconnecting said plunger housing and said shift fork, vacuum responsive means for effecting disengagement of said main clutch means and actuation of said brake means, solenoid actuated valve means adapted when electrically energized to render said vacuum responsive means operative, electric circuit means including switch means for said solenoid actuated valve means, a spring biased plunger extending through said plunger housing, means for selectively effecting movement of said plunger whereby said plunger housing is spring loaded for pivotal movement and said compound clutch element is conditioned for disengagement from said first position and biased into a second position clutching said drive and driven shafts together when said second clutch element is being engaged, and said plunger when moved effecting actuation of said switch means for closing said electric circuit means to thereby electrically energize said solenoid actuated valve means when said compound clutch element is shifted between said first and second positions.

10. In combination, a drive shaft, main clutch means operatively connected to said drive shaft, a driven shaft, a gear driven from said drive shaft and journaled on said driven shaft, a compound clutch element non-rotatably mounted on said driven shaft and axially movable therealong, said compound clutch element being adapted in one position to clutch said gear to said driven shaft in one direction of rotation of said gear relative to said driven shaft and in another position to clutch said drive and driven shafts together in one direction of rotation of said drive shaft relative to said driven shaft, a first clutch element non-rotatably mounted on said compound clutch element and axially movable therealong, said first clutch element being adapted to clutch said gear to said driven shaft in the other direction of rotation of said gear relative to said driven shaft, a second clutch element non-rotatably mounted on said compound clutch element and axially movable therealong, said second clutch element being adapted to clutch said drive and driven shafts together in the other direction of rotation of said drive shaft relative to said driven shaft, means for effecting engagement of said first clutch element upon rotation of said gear in one direction relative to said driven shaft and for effecting disengagement of said first clutch element upon rotation of said gear in the other direction relative to said driven shaft, means for effecting engagement of said second clutch element upon rotation of said drive shaft in one direction relative to said driven shaft and for effecting disengagement of said second clutch element upon rotation of said drive shaft in the other direction relative to said driven shaft, a shift fork for effecting movement of said compound clutch element, first spring means associated with said shift fork for normally biasing said compound clutch element into a first position clutching said gear and said driven shaft together when said first clutch element is being engaged, a pivotally mounted plunger housing, a lever operatively interconnecting said plunger housing and said shift fork, a vacuum responsive means for effecting disengagement of said main clutch means, solenoid actuated valve means adapted when electrically energized to render said vacuum responsive means operative, electric circuit means for said solenoid actuated valve means, said electric circuit means including first and second switches connected in series, said first switch being normally open and said second switch normally closed, a spring biased plunger extending through said plunger housing, means for selectively effecting movement of said plunger whereby said plunger housing is spring loaded for pivotal movement thereby conditioning said compound clutch element for disengagement from said first position and movement toward said second position for clutching said drive and driven shafts together, said plunger when moved effecting closing of said first switch for closing said electric circuit means to thereby electrically energize said solenoid actuated valve means and effect disengagement of said main clutch means whereby the driving force between said compound clutch element and said gear is removed permitting said compound clutch element to move to said second position under the biasing force of the spring loaded plunger housing, and a portion of said plunger housing being adapted to open said second switch and said electric circuit means to permit reengagement of said main clutch means and release of said brake means when said compound clutch element is moved into said second clutching position.

11. For use with a prime mover, the combination of a transmission and control means therefor comprising, a first drive member, a second drive member, a driven member, main friction clutch means for selectively clutching said first and second drive members to said prime mover, power actuated means for controlling engagement and disengagement of said main friction clutch means, brake means associated with said first and second drive members, brake actuating means associated with said power actuated means whereby when said main friction clutch means is engaged said brake means is disengaged and when said main friction clutch means is disengaged said brake means is engaged, a compound clutch mechanism adapted in one position to clutch said first drive member to said driven member as said first drive member begins to overrun said driven member, said compound clutch mechanism being adapted in another position to clutch said second drive member to said driven member as said driven member begins to overrun said second drive member, a shift fork for effecting movement of said compound clutch mechanism, first spring means associated with said shift fork for normally biasing said compound clutch mechanism into said one position clutching said first drive member and said driven member together, second spring means associated with said shift fork for selectively counteracting said first spring means and biasing said compound clutch mechanism into said other position clutching said second drive member and said driven member together, control means for said power actuated means being adapted to effect disengagement of said main friction clutch means and engagement of said brake means during shifting of said compound clutch mechanism from its said one position to its said other position, and said control means controlling said power actuated means whereby when said compound clutch mechanism is to be initially moved from its said other position said main friction clutch means is disengaged and said brake means lightly engaged and at the first movement of said compound clutch mechanism toward its said one position said main friction clutch means is engaged and said brake means disengaged.

12. For use with a prime mover, the combination of a transmission and control means therefor comprising, a drive shaft, a driven shaft, a gear driven from said drive shaft and journaled on said driven shaft, main friction clutch means for selectively clutching said drive shaft to said prime mover, power actuated means for controlling engagement and disengagement of said main friction clutch means, brake means associated with said drive shaft, brake actuating means associated with said power actuated means for disengaging said brake means when said main friction clutch means is engaged and engaging said brake means when said main friction clutch means is disengaged, a compound clutch mechanism adapted in one position to clutch said gear to said driven member as said gear begins to overrun said driven shaft, said compound clutch mechanism being adapted in another position to clutch said drive shaft to said driven shaft as said driven shaft begins to overrun said drive shaft, a shift fork for effecting movement of said compound clutch mechanism, first spring means associated with said shift fork for normally biasing said compound clutch mechanism into said one position clutching said gear and said driven shaft together, second spring means associated with said shift fork for selectively counteracting said first spring means and biasing said compound clutch mechanism into said other position clutching said drive shaft and said driven shaft together, control means for said power actuated means being adapted to effect disengagement of said main friction clutch means and engagement of said brake means during shifting of said compound clutch mechanism from its said one position to its said other position, and said control means controlling said power actuated means whereby when said compound clutch mechanism is to be initially moved from its said other position said main friction clutch means is disengaged and said brake means lightly engaged and at the first movement of the compound clutch mechanism towards its said one position said main friction clutch means is engaged and said brake means disengaged.

13. For use with a prime mover, the combination of a transmission and control means therefor comprising, a first drive member, a second drive member, a driven member, main friction clutch means for selectively clutching said first and second drive members to said prime mover, brake means associated with said first and second drive members, power actuated means for effecting disengagement of said main friction clutch means and engagement of said brake means, solenoid actuated valve means when electrically energized being adapted to render said power actuated means operative, a compound clutch mechanism adapted in one position to clutch said first drive member to said driven member as said first drive member begins to overrun said driven member, said compound clutch mechanism being adapted in another position to clutch said second drive member to said driven member as said driven member begins to overrun said second drive member, a shift fork for effecting movement of said compound clutch mechanism, first spring means associated with said shift fork for normally biasing said compound clutch mechanism into said one position clutching said first drive member and said driven member together, second spring means associated with said shift fork for selectively counteracting said first spring means and biasing said compound clutch mechanism to said other position clutching said second drive member and said driven member together, means for electrically energizing said solenoid actuated valve means during shifting of said compound clutch mechanism from its said one position to its said other position, and said last-named means being sequentially operable to effect electrical energization of said solenoid actuated valve means when said compound clutch mechanism is to be initially moved from its said other position and at the first movement of said compound clutch mechanism toward its said one position to effect deenergization of said solenoid actuated valve means.

ROBERT LAPSLEY.

References Cited in the file of this patent

UNITED STATES PATENTS

| Number | Name | Date |
|---|---|---|
| 731,087 | Tucker | June 16, 1903 |
| 2,327,063 | Randol | Aug. 17, 1943 |
| 2,620,667 | Flinn | Dec. 9, 1952 |